US011479227B2

(12) United States Patent
Moon et al.

(10) Patent No.: US 11,479,227 B2
(45) Date of Patent: Oct. 25, 2022

(54) COMPRESSED AIR PROCESSING SYSTEM FOR COMMERCIAL VEHICLE

(71) Applicant: SEMYUNGTECH CO., LTD., Seoul (KR)

(72) Inventors: Seong-won Moon, Asan-si (KR); Sang-sun Park, Iksan-si (KR)

(73) Assignee: SEMYUNGTECH CO., LTD., Seoul (KR)

( * ) Notice: Subject to any disclaimer, the term of this patent is extended or adjusted under 35 U.S.C. 154(b) by 0 days.

(21) Appl. No.: 17/555,544

(22) Filed: Dec. 20, 2021

(65) Prior Publication Data

US 2022/0194342 A1  Jun. 23, 2022

Related U.S. Application Data

(63) Continuation of application No. PCT/KR2020/018820, filed on Dec. 21, 2020.

(30) Foreign Application Priority Data

Dec. 18, 2020 (KR) .................. 10-2020-0178398

(51) Int. Cl.
*B60T 13/68* (2006.01)
*B60T 13/26* (2006.01)
*B60T 17/00* (2006.01)

(52) U.S. Cl.
CPC ............ *B60T 13/683* (2013.01); *B60T 13/26* (2013.01); *B60T 17/002* (2013.01)

(58) Field of Classification Search
CPC ...... B60T 13/26; B60T 13/268; B60T 13/683; B60T 17/002; B60T 17/004; B60T 17/02; B60R 16/08; F15B 11/06; F15B 2211/615
See application file for complete search history.

(56) References Cited

U.S. PATENT DOCUMENTS

| | | | | |
|---|---|---|---|---|
| 6,332,623 B1 * | 12/2001 | Behmenburg | ..... | B60G 17/0408 280/124.16 |
| 6,817,600 B2 * | 11/2004 | Ocker | ................ | B60G 17/0523 280/124.157 |
| 6,824,145 B2 * | 11/2004 | Behmenburg | ..... | B60G 17/0408 152/416 |

FOREIGN PATENT DOCUMENTS

| | | | | |
|---|---|---|---|---|
| DE | 102010009035 A1 * | 8/2011 | ............ | B60T 17/002 |
| DE | 102013011785 A1 * | 1/2015 | ............ | B01D 53/261 |
| EP | 2140926 B1 * | 10/2012 | ............ | B60T 17/004 |
| JP | 2015-535060 A | 12/2015 | | |
| KR | 10-2014-0035458 A | 3/2014 | | |
| KR | 10-2014-0078172 A | 6/2014 | | |
| KR | 20140074592 A * | 6/2014 | ............ | F04B 39/16 |
| KR | 10-2015-0044350 A | 4/2015 | | |
| WO | WO-2011134575 A2 * | 11/2011 | ............ | B01D 53/266 |

(Continued)

*Primary Examiner* — Thomas J Williams
(74) *Attorney, Agent, or Firm* — Revolution IP, PLLC

(57) ABSTRACT

The present disclosure provides a compressed air processing system of which the operation of supplying compressed air and the regeneration operation can be efficiently controlled by an electronic control unit. In particular, the present disclosure is characterized in that the pressure of a regeneration sequence valve installed in a regeneration line is increased over a set pressure by controlling a valve, which is electronically controlled, to switch, so the opening time of the regeneration line is delayed in comparison to the opening time of an unloader valve, whereby regeneration efficiency is improved.

13 Claims, 2 Drawing Sheets

(56) References Cited

FOREIGN PATENT DOCUMENTS

| WO | WO-2016169977 A1 * | 10/2016 | ............ B60T 17/22 |
| WO | 2018-105711 A1 | 6/2018 | |

* cited by examiner

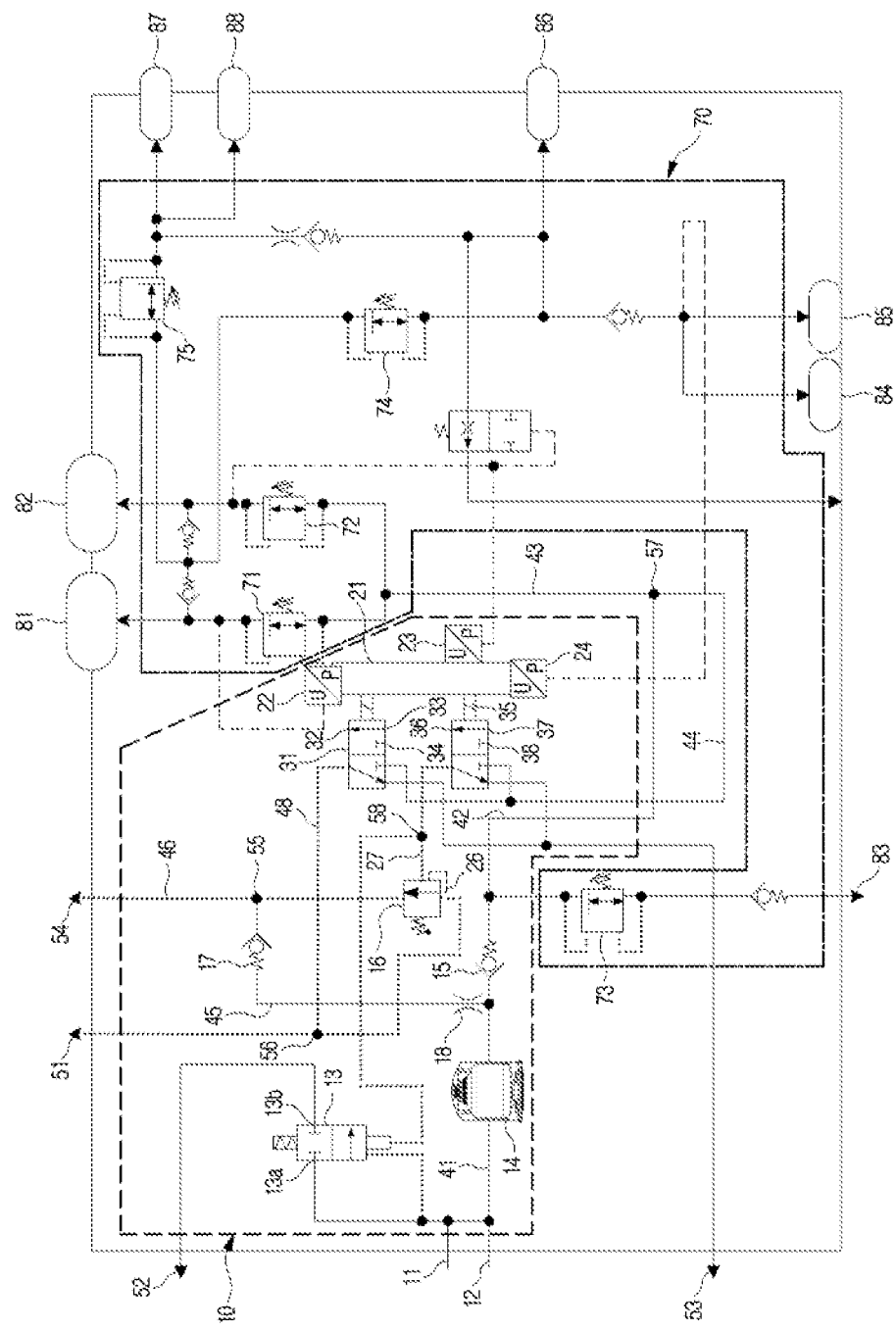
[FIG. 1]

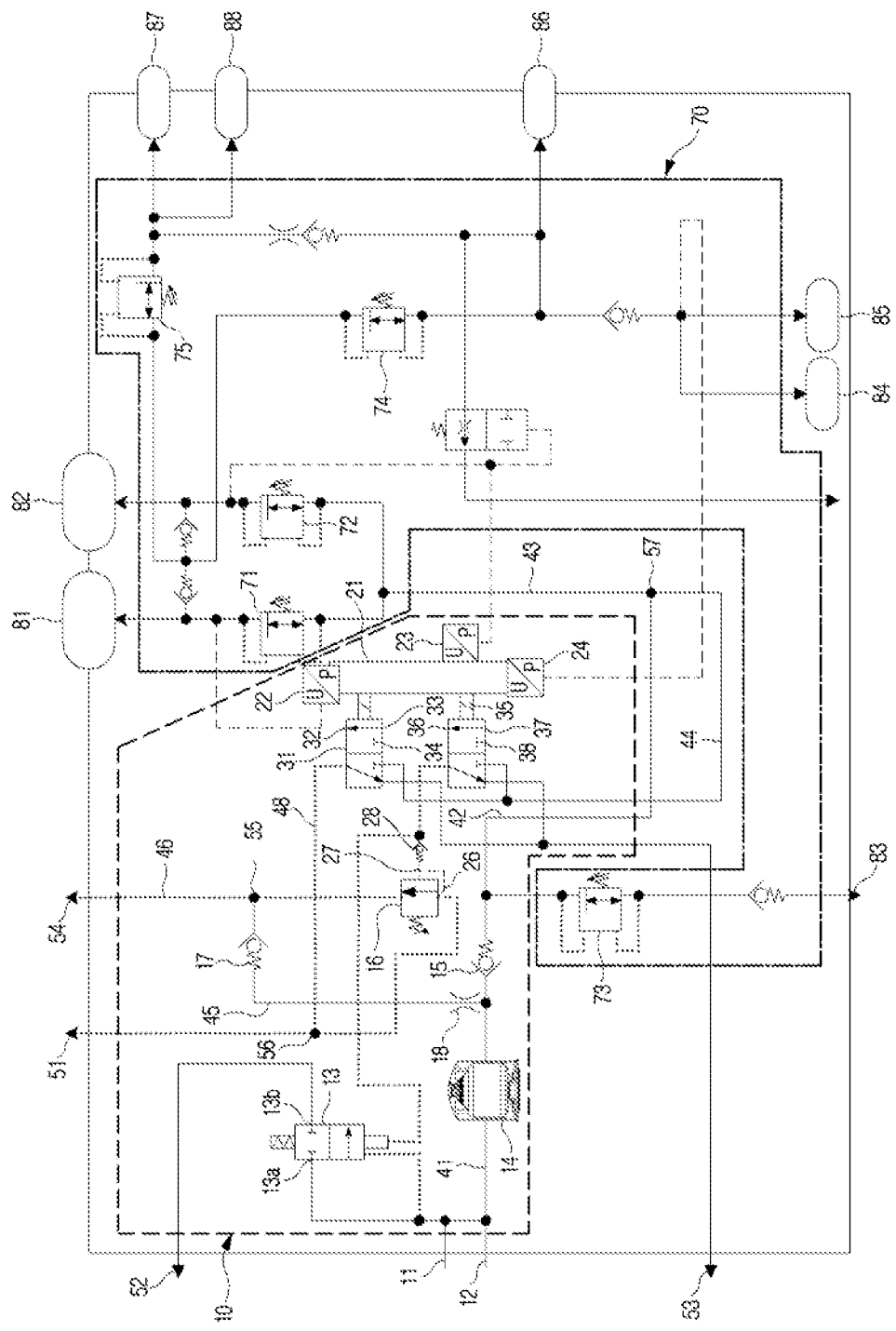
[FIG. 2]

COMPRESSED AIR PROCESSING SYSTEM FOR COMMERCIAL VEHICLE

CROSS-REFERENCE TO RELATED APPLICATION

This application is a Continuation Application of International Application No. PCT/KR2020/018820 filed on Dec. 21, 2020, which claims priority to Korean Application No. 10-2020-0178398 filed on Dec. 18, 2020, the entire contents of each of the above-identified applications are hereby incorporated by reference.

TECHNICAL FIELD

The present disclosure relates to a compressed air processing system for a commercial vehicle and, more particularly, to a compressed air processing system that supplies compressed air, which is used for the braking system, suspension system, etc. of commercial vehicle, with oil, water, and foreign substance filtered out from the air, and that regenerates an air drier by sending the compressed air backward.

BACKGROUND ART

Commercial vehicles are equipped with various operation systems that use air pressure to control the operation of the large and heavy commercial vehicles. For example, a service brake system, a pneumatic suspension system, a parking brake system, etc. are such pneumatic systems. Compressed air at high pressure is required to drive such pneumatic systems. Such compressed air is produced through a compressor, which is driven by an engine or a driving motor, and then sent to the reservoirs of systems that use the compressed air.

The compressed air that is supplied through a compressor contains foreign substances including oil and water. Such foreign substances such as oil and water in compressed air have a bad influence on systems such as causing breakdown or deteriorating durability of pneumatic systems.

In order to remove oil, water, etc. contained in compressed air, a drier unit including a filter cartridge filled with a drying agent is included in a compressed air processing system. Such a dryer unit is installed on a supply line of compressed air to discharge dry and clean air to each system by not only filtering out oil, but removing water contained in compressed air flowing from a compressor.

The compressed air processing efficiency in the filter cartridge decreases over time, and there is a need for a regeneration process that sends compressed air processed already, backward to improve the efficiency of the filter cartridge, particularly, the water removal efficiency of the drying agent. Compressed air that has been processed already flows back to the filter cartridge and water and foreign substances existing in the filter cartridge are discharged outside through this regeneration process.

Various valves installed in channels are controlled when processes of supplying and regenerating compressed air are performed, whereby the process of supplying or regenerating compressed air is selectively performed.

The recent trend of the automobile industry is focused on improvement of fuel efficiency through light-weighting, optimal control, etc., and particularly, commercial vehicles are gradually increasing in size due to price competition of product transportation, so a technology for improve energy efficiency is necessarily required. As a part, technologies of enabling an ECU to electronically control a system under optimal conditions for air supply on the basis of vehicle information received through vehicle communication are applied.

In particular, a technology of improving the driving efficiency of a compressor and preventing unnecessary consumption of compressed air by implementing an optimal regenerating operation is required for a compressed air processing system of an electronic control type.

DISCLOSURE

Technical Problem

The present disclosure has been made in an effort to solve the problems described above and an objective of the present disclosure is to provide a compressed air processing system of which the operation of supplying and regenerating compressed air can be efficiently controlled by an electronic control unit.

In particular, another objective of the present disclosure is to solve the problem of reduction of regeneration efficiency due to high-pressure compressed air remaining in a compressed air supply line.

Another objective of the present disclosure is to provide a compressed air supply system that can minimize a loss of regenerating operation even if the switching timing of a valve is changed due to aging of the valve.

Technical Solution

In order to achieve the objectives, a compressed air processing system for a commercial vehicle of the present disclosure includes a regeneration sequence valve connected with a first electronic control valve and a second electronic control valve and configured to open a regeneration line by receiving control input through the first electronic control valve and the second electronic control valve, in which the regeneration sequence valve is configured to open the regeneration line late by a delay until reaching a preset pressure by receiving air from the first electronic control valve and the second electronic control valve.

In particular, the unloader valve is configured to open in advance before compressed air flows into a filter cartridge through a regeneration line, whereby regeneration efficiency is improved and durability of the unloader valve is improved.

Further, in a preferred embodiment of the present disclosure, when regeneration is performed by switching of the electronic control valve, regenerating air is discharged not only to the unloader valve at the compressor, but the exhaust side of the separator-cooler(sep-cooler), whereby sequence for discharging foreign substances is unified.

Advantageous Effects

According to the present disclosure, there is an effect that the pressure of a regeneration sequence valve installed in a regeneration line is increased over a switching pressure by controlling a valve, which is electronically controlled, to switch the position of the valve, so the opening time of the regeneration line is delayed in comparison to unloading of the compressor, whereby regeneration efficiency is improved.

In particular, according to a preferred embodiment of the present disclosure, since the system is implemented such that the unloader valve is opened before the regeneration line is opened, there is an effect that it is possible to prevent overpressure from being generated in the compressed air supply line. Further, it is possible to solve the problem that initial regeneration efficiency is decreased due to the high-pressure compressed air remaining in the compressed air supply line in regeneration.

Further, according to the present disclosure, since the unloader valve is opened in advance before regeneration is completely started, it is possible to reduce shock that is applied to the unloader valve at the early stage of regeneration, so there is an effect that the durability of the unloader valve can be improved.

Further, according to the present disclosure, when the regeneration sequence valve and the unloader valve are opened for regeneration and then closed when regeneration is finished, it is possible to prevent the valves from being rapidly closed after air is rapidly moved, by the cut-off delay function of the valves, so there is an effect that the durability of the valve parts can be improved.

Further, according to the present disclosure, since it is possible to implement a valve opening delay function even without adding a specific control logic or other parts, in regeneration, there is an effect that the control logic can be simplified and the manufacturing cost can be reduced.

Further, according to a preferred embodiment of the present disclosure, there is an effect that it is possible to minimize a loss of compressed air during regenerating operation through a delay of the regeneration sequence valve even if the switching timing of a valve is changed due to aging of the valve.

Further, according to a preferred embodiment of the present disclosure, since it is possible to discharge compressed air not only to the unloader valve at the compressor, but to the exhaust side of the separator-cooler(sep-cooler), there is an effect that it is possible to effectively discharge foreign substances remaining in the sep-cooler in regeneration process.

Further, according to a preferred embodiment of the present disclosure, since a large amount of compressed air can be discharged to the sep-cooler with the unloader valve closed, there is an advantage that it is possible to effectively discharge oil adhering to the inside of the sep-cooler.

DESCRIPTION OF DRAWINGS

FIG. 1 shows a compressed air processing apparatus according to a first embodiment of the present disclosure.

FIG. 2 shows a compressed air processing apparatus according to a second embodiment of the present disclosure.

BEST MODE

In order to achieve the objectives, a preferred embodiment of the present disclosure provides a compressed air processing system for a commercial vehicle that includes: a first electronic control valve controlled by an electronic control unit; a second electronic control valve controlled by the electronic control unit; and a regeneration sequence valve connected with the first electronic control valve and the second electronic control valve and configured to open a regeneration line by receiving control inputs through the first electronic control valve and the second electronic control valve, in which the regeneration sequence valve is configured to open the regeneration line late by a delay until reaching a preset pressure by receiving air through the first electronic control valve and the second electronic control valve.

Further, the compressed air processing system may further include: a compressor control outlet connected to the first electronic control valve; and an unloader valve connected to a compressed air supply line connected to a compressor, and pneumatically driven by receiving control input through the second electronic control valve, in which the first electronic control valve and the second electronic control valve may be connected to a main supply line connected to the compressed air supply line.

In this case, the first electronic control valve may be controlled to switch the valve postion by the electronic control unit and transmits air in the main supply line to the compressor control outlet and the regeneration sequence valve, and the second electronic control valve may be controlled to switch the valve postion by the electronic control unit and transmits the air in the main supply line control input for the unloader valve and the regeneration sequence valve, respectively.

In particular, the electronic control unit may be configured to change the compressor in a driving state by controlling the first electronic control valve to switch and configured to open the unloader valve by controlling the second electronic control valve to switch; and the regeneration sequence valve may operate to open the regeneration line only when the first electronic control valve and the second electronic control valve are both open.

Further, in regeneration, the second electronic control valve is controlled to open the unloader valve by the electronic control unit and the unloader valve is opened in advance before the regeneration line is opened.

Further, the regeneration sequence valve is connected to a first control input line into which air flows through the first electronic control valve and a second control input line into which air flows through the second electronic control valve and that is separated from the first control input line; and is configured to be opened by air supplied through the first control input line and the second control input line when internal pressure of the regeneration sequence valve reaches preset pressure.

Further, as another example, the regeneration sequence valve is connected to a first control input line into which air flows through the first electronic control valve and a second control input line into which air flows through the second electronic control valve and that is connected to the first control input line; a check valve is installed between an intersection of the first control input line and the second control input line and the second electronic control valve; and the regeneration sequence valve is configured to be opened by air supplied through the first control input line and the second control input line when internal pressure of the regeneration sequence valve reaches preset pressure.

MODE FOR INVENTION

A compressed air processing system according to preferred embodiments of the present disclosure is described hereafter with reference to the accompanying drawings.

Embodiments to be described hereafter are provided only for detailed description for those skilled in the art to be able to easily achieve the present disclosure without limiting the protective range of the present disclosure. Accordingly, some components may be substituted or changed without departing from the necessary range of the present disclosure.

When a component is 'connected' with another component in the following description, it includes not only direct connection of them, but connection of them with another element or device therebetween. Further, unless explicitly described otherwise, 'comprising' any components will be understood to imply the inclusion of other components rather than the exclusion of any other components.

A compressed air processing system that is described herein, similar to the existing systems, includes a filter cartridge for removing oil, water, etc. contained in compressed air that is supplied from a compressor. The expression that compressed air is 'processed' herein means that oil, water, and foreign substances in compressed air are filtered out while the compressed air passes through the filter cartridge.

The compressed air processing system that is described herein is configured such that compressed air processed through a filter can be supplied in one direction and compressed air processed already under predetermined conditions are sent back to be regenerated in opposite direction.

A supply step stated herein means a process of processing air compressed by a compressor through the filter cartridge and then supplying the compressed air to a compressed air consumption system, and a regeneration step means a process of regeneration the inside of the filter cartridge by sending compressed air processed already back to the filter cartridge.

FIG. 1 shows a compressed air processing apparatus according to a first embodiment of the present disclosure. A compressed air processing system 1 according to a preferred embodiment of the present disclosure includes a drier unit 10 and a valve assembly 70. The part indicated by a dashed line at the left side in FIG. 1 shows the drier unit 10 that is supplied with compressed air from a compressor, dries the compressed air through a filter cartridge 14, and then supplies the compressed air to the valve assembly 70. Further, the compressed air processing system 1, as shown at the other side, that is, the part indicated by a dashed dotted line in FIG. 1, may be configured to a valve assembly 70 including valves that supply compressed air from a downstream side of a first supply line 43 to each compressed air consumption system at a divergence point 57.

As shown in FIG. 1, the compressed air processing system according to a preferred embodiment of the present disclosure is configured to be able to process compressed air, which flows through a compressed air inlet connected to a compressor (not shown), through the filter cartridge 14 and then to supply the processed air to a valve assembly 70 connected to each compressed air consumption system.

The compressor not shown is an apparatus that suctions, compresses, and then discharges surrounding air, and the compressed air inlet is an intake port for transmitting the compressed air discharged from the compressor to the compressed air processing system according to the present disclosure. Further, as shown in FIG. 1, another compressed air inlet may be included other than the compressed air inlet 11, and a supplementary compressed air inlet 12 may be used to supply compressed air produced by another compressed air source at the outside into the system other than the purposes of vehicle maintenance, etc.

The compressed air supplied through the compressed air inlet 11 can be supplied to the filter cartridge 14 through a compressed air supply line 41. The filter cartridge 14 is a filter structure including a drying agent, a drying agent for securing dehumidifying performance is received in the cartridge, and an oil absorption filter is disposed at the compressed air inlet to be able to remove oil.

Accordingly, the compressed air supplied through the compressed air inlet 11 is processed while passing through the filter cartridge 14. The processed compressed air can be supplied to a main supply line 42 at the center through a main check valve 15. The main check valve 15 is provided to prevent the processed compressed air existing in the main supply line 42 at the center from flowing back to the filter cartridge 14.

The main supply line at the center includes a divergence point 57, and a first supply line 43 for supplying compressed air to the valve assembly 70 connected to consumption systems and a second supply line 44 connected to an electronic control valve for regeneration control are connected to the divergence point 57.

Several consumption systems are connected to the first supply line 43. For example, as shown in FIG. 1, such consumption systems may be first and second brake systems 81 and 82, a parking brake system 84, an air suspension system 83, a trailer supply system 85, and assistant supply systems 86, 87, 88. Overflow valves 71, 72, 73, 74, and 75 for protecting circuits may be installed in the channels connected to the systems, respectively. The overflow valves 71, 72, 73, 74, and 75 have opening pressure set to open the channels, and can apply pressure to the systems, respectively, when the predetermined opening pressures are exceeded.

The opening pressures of the valves 71, 72, 73, 74, and 75 connected to circuits, respectively, are set on the basis of the priorities of the consumption circuits. Preferably, the opening pressures of the overflow valves 71 and 72 for the service brake system are set lowest so that compressed air can be supplied first to the service brake. Accordingly, when compressed air is sufficiently supplied to the service brake and the pressure in the line is increased, the overflow valves are sequentially opened in accordance with the opening pressures thereof and compressed air can be supplied to the consumption circuit. Further, check valves for preventing backflow may be installed in the valve assembly 70.

Meanwhile, the second supply line 44 corresponds to a supply line of compressed air for a regeneration process. The compressed air passing through the second supply line 44 may be used as control input for regeneration control and may be used as compressed air for regeneration that is supplied to the filter cartridge 14 through the regeneration line 45.

To this end, the compressed air processing system according to the present disclosure includes two electronic control valves and includes an electronic control unit 21 for electronically controlling the electronic control valves. The electronic control unit 21 can be electrically connected with another controller, sensors, or the like in a vehicle, and preferably, and is configured to be able to receive various items of state information of the vehicle in real time from the controller, sensors, of the like. For example, as in FIG. 1, the electronic control unit 21 may be connected to pressure sensors 22, 23, and 24 for measuring pressure at specific positions in the compressed air processing system. Further, the electronic control unit 21 is configured to be able to control switching of the electronic control valves in accordance with the state information of the vehicle received from another controller, sensors such as a pressure sensor, or the like.

The electronic control valves can selectively control a supplying mode and a regeneration mode, so, in the present disclosure, it is possible to selectively perform a supplying step or a regeneration step on the basis of the current state of the vehicle through the electronic control unit 21.

The two electronic control valves may be solenoid valves that are electrically operated and they are referred to as a first electronic control valve 31 and a second electronic control valve 35 herein. The two electronic control valves both can be used to perform the regeneration step, and preferably, switching the positions of the two valves may be simultaneously or sequentially controlled such that the regeneration step is finished.

In particular, according to a preferred embodiment of the present disclosure, the first electronic control valve 31 and the second electronic control valve 35 may be 3-port 2-position valves, as in FIG. 1. For example, the first electronic control valve 31 may include a first port 32 connected to a compressor control outlet 51, a second port 33 connected to the second supply line 44, and a third port 34 connected to a vent 53. Further, the first electronic control valve 31 may have a first position where the first port 32 and the third port 34 are connected with each other and a second position where the first port 32 and the second port 33 are connected with each other. When power is not supplied, that is, the first electronic control valve 31 is turned off, as in FIG. 1, the first electronic control valve 31 is at the first position, and accordingly, the second supply line 44 is closed and the compressor control outlet 51 is connected to the vent 53. On the contrary, when power is supplied, that is, the first electronic control valve 31 is turned on, the first electronic control valve 31 is switched to the second position, and accordingly, the second supply line 44 is connected to the compressor control outlet through the first electronic control valve 31. Accordingly, at the second position of the first electronic control valve 31, compressed air is transmitted to the compressor control outlet 51, and accordingly, the compressor can be changed into a driving state. That is, when control input is supplied to the compressor through the compressor control outlet 51, the compressor is changed into the driving state and can assist particularly a regeneration sequence valve in the system to open.

Further, according to a preferred embodiment of the present disclosure, the first port 32 of the first electronic control valve 31 diverges at the divergence point 56 of the line connected to the compressor control outlet 51 such that compressed air can be supplied to the regeneration sequence valve 16 of the regeneration line 45. Accordingly, when the first electronic control valve 31 is controlled to be switched to the second position, control input can be applied to the compressor control outlet 51 and the compressed air in the main supply line can be supplied to a first control input line 26 of the regeneration sequence valve 16. Further, the regeneration sequence valve 16 is connected to a second control input line 27 connected with the second electronic control valve 35. When the pressures of the compressed air that are applied through the two control input lines 26 and 27 reach a predetermined set pressure, the internal channel of the regeneration sequence valve is opened. The regeneration sequence valve will be described in more detail below.

Meanwhile, the electronic control valve 35 may also be a 3-port 2-position valve, similar to the first electronic control valve 31.

Similar to the first electronic control valve 31 described above, the second port 37 may be connected to the second supply line 44 and the third port 38 may be connected to the vent 53. Meanwhile, the first port 36 of the second electronic control valve 35 is transmitted as control input for controlling opening/closing of an unloader valve 13. Accordingly, as in FIG. 1, the first port 36 is connected to a control inlet of the unloader valve 13.

The unloader valve 13 is installed on an exhaust line 47 to discharge compressed air to the atmosphere through an exhaust outlet 52. The unloader valve 13 may be 2-port 2-position valve and may be configured to be pneumatically driven by receiving control input through the second electronic control valve 35. Accordingly, compressed air that has passed through the second electronic control valve 35 is applied to the control inlet of the unloader valve 13, whereby the unloader valve 13 is moved to a second position from a first position against the spring force of the unloader valve 13. The first position, as in FIG. 1, means the state a first port 13a diverging from the compressed air supply line 41 between the compressor and the filter cartridge 14 and a second port 13b connected to the exhaust outlet 52 are disconnected, and the second position means a valve position where two ports are connected to each other and the air in the compressed air supply line 41 can be discharged to the exhaust outlet 52.

Further, the unloader valve 13 is configured to open by receiving another control input from the compressed air supply line 41, and is configured to be able to discharge air in the compressed air supply line 41 to the outside when the pressure of the compressed air supply line 41 exceeds a preset pressure. Accordingly, the unloader valve 13 can automatically open even if a pressure increase that is not allowable is generated, whereby it is possible to prevent overpressure in the compressed air supply line 41. In relation to this, the unloader valve 13 may be configured to open in accordance with the maximum supply pressure of the compressed air supply line 41.

Meanwhile, the compressed air flowing inside through the first port 36 of the second electronic control valve is characterized by being divided at the divergence point 58 and supplied to the second control input line 27. The second control input line 27 is another control input for connection to the regeneration sequence valve. Accordingly, when the second electronic control valve is controlled to be switched to the second position, the compressed air in the regeneration line is supplied to the second control input line through the second electronic control valve. Accordingly, a preferred embodiment of the present disclosure is characterized in that compressed air is supplied through two control input lines connected to the regeneration sequence valve, that is, the first control input line 26 and the second control input line 27.

In relation to this, the detailed structure of the regeneration sequence valve 16 is described. The regeneration sequence valve 16 includes a spring to close the internal channel in a normal state, and is configured to be able to open when the spring is pressed by the pressure of air flowing inside from the input side. The air that is supplied to the regeneration sequence valve 16 through the first control input line 26 and the second control input line 27 presses the spring, and pushes the spring such that the internal channel of the valve can be opened when it overcomes the spring force of the spring. For example, considering the pressure condition through the first control input line 26 and the condition of the second control input line 27, it is preferable that the regeneration sequence valve is set not to open when pressure is applied from only any one of the two input lines and to open only when pressure is applied from both of the two input lines. In this case, two electronic control valves may be simultaneously opened. More preferably, the lines may be controlled in two-stage control type such that pressure is applied through the first control input line 26 and compressed air primarily flows inside (that is, the first electronic control valve 31 is opened first) and then pressure is applied through the second control input line 27 (that is, the second electronic control valve 31 is opened later). In this case, the pressure of the regeneration sequence valve is increased step by step, so there is an effect that the durability of the valve can be improved.

Accordingly, when the set pressure of the regeneration sequence valve is reached and the internal channel of the valve is opened, compressed air that has passed through the first electronic control valve 31 and the second electronic control valve 35 can flows to the internal channel of the regeneration sequence valve through the first and second control input lines 26 and 27 and can be supplied to the regeneration line 45.

The opening conditions of the regeneration sequence valve are as follows. First, when the electronic control unit 21 controls the first electronic control valve 31 to switch and the compressed air in the main supply line 42 flows into the control line 48, some of the compressed air flowing in the control line 48 is supplied to the regeneration sequence valve 16 through the first control input line 26. Meanwhile, the set pressure of the regeneration sequence valve 16 is set higher than the pressure of the air flowing inside through the control line 48, so the spring can be pressed and the internal channel of the valve can be opened only when the pressure that is applied to the regeneration sequence valve gradually increases and exceeds the set pressure. For example, when compressed air flows into the control input side of the regeneration sequence valve 16, the regeneration sequence valve 16 is not opened unless another control is performed.

In this case, when the second electronic control valve 35 is controlled to switch and the second control input line 27 is opened, pressure exceeding the set pressure of the regeneration sequence valve 16 is generated, so the regeneration sequence valve 16 is opened.

In relation to this, the regeneration sequence valve may have a structure in which predetermined pressure is maintained in accordance with the initial pressure level of compressed air and then the pressure in the valve is gradually increased up to the set pressure of the valve, whereby the channel in the valve can be opened. To this end, the set pressure of the regeneration sequence valve 16 is set higher than the pressure of the compressed air in the main supply channel, and preferably, the regeneration sequence valve 16 may be set to be open when a predetermined time passes after the first electronic control valve 31 is opened.

Accordingly, the regeneration sequence valve 16 is configured to be able to open the regeneration line 45 by control input of an electronic control valve, and preferably, may be a normally closed valve that is installed at the upstream side of the regeneration line 45.

Further, the regeneration sequence valve 16 is connected to the regeneration line 45 in which a regeneration check valve 17 is installed, and it flows back to the filter cartridge 14 through the regeneration line 45. The regeneration check valve 17, which is a component for preventing air in the regeneration line 45 from flowing backward, enables the compressed air that has passed through the filter cartridge 14 to be supplied only to the main check valve 15 without flowing backward through the regeneration line 45 in the supplying step. In the regeneration process, the air flowing back to the filter cartridge 14 flows to the compressed air supply line 41 and is discharged to the atmosphere through the exhaust outlet 52 after passing through the unloader valve 13. Further, a throttle 18 may be disposed on the regeneration line 45. The throttle 18 is a pipe decreasing the diameter of a portion of the regeneration line 45. Compressed air flowing into the filter cartridge 14 decreases in pressure while passing through the throttle 18.

The regeneration line 45 may include a divergence point 55 and may be connected to a sep-cooler through a sep-cooler exhaust line 46 and a sep-cooler inlet port 54 that are connected to the divergence point 55. The sep-cooler is provided to filter out foreign substances such as oil contained in the air flowing into the compressor. Accordingly, compressed air is supplied through the sep-cooler exhaust line 46 diverging between the regeneration check valve 17 and the regeneration sequence valve 16, and is then discharged through an exhaust port of the sep-cooler after passing through the inside of the sep-cooler. Accordingly, in the regeneration step, it is possible to discharge the foreign substances remaining in the sep-cooler while regenerating the filter cartridge 14.

Further, it is preferable that the second electronic control valve 35 is controlled by the electronic control unit such that the unloader valve 13 is opened in advance before the regeneration sequence valve 16 opens the regeneration line 45. Accordingly, regeneration is performed with the compressed air in the compressed air supply line 41 sufficiently discharged, so the regeneration efficiency can be improved.

For example, the electronic control valve 21 can simultaneously control the first electronic control valve 31 and the second electronic control valve 35 to switch, whereby opening the unloader valve 13 and converting the compressor into the unloading state can be finished before the regeneration sequence valve 16 is opened.

Hereafter, the operation of the compressed air processing system according to the present disclosure is described with reference to FIG. 1 according to the first embodiment of the present disclosure.

First, FIG. 1 shows the situation in which compressed air is supplied with the first electronic control valve 31 and the second electronic control valve 35 at first positions, respectively.

Since both of the electronic control valves 31 and 35 are not operated yet, so the regeneration line is in an inactivated state in FIG. 1. In detail, when power is not supplied to the first electronic control valve 31, the first port 32 of the first electronic control valve 31 is connected with the vent 53 through the third port 34 and the pressure between the first port 32 and the regeneration sequence valve 16 does not reach the set pressure of the regeneration sequence valve 16, so the regeneration sequence valve 16 is closed, that is, the regeneration line 5 keeps closed by the regeneration sequence valve 16.

Meanwhile, when cartridge regeneration is required, the first and second electronic control valves 31 and 35 are simultaneously or sequentially opened, so the regeneration sequence valve 16 is opened and the compressed air in the main channel is supplied to the filter cartridge through the regeneration line, whereby regeneration is performed.

In an embodiment, the regeneration sequence valve 16 is configured such that when the air that has passed through the first electronic control valve 31 flows into the first control input line 26 of the regeneration sequence valve 16, the inflow air transmits pressure in a direction in which the spring 25 in the regeneration sequence valve 16 is compressed. Further, as the second electronic control valve 35 is controlled to switch to the second position, air flows inside through the second control input line 27 of the regeneration sequence valve 16, and similarly, transmits pressure in the direction in which the spring in the regeneration sequence valve 16 is compressed. If a preset operation pressure, that is, a set pressure of the regeneration sequence valve 16 is reached, a channel in the valve connected to the regeneration line 45 is formed while overcoming the restoring force of the spring. Accordingly, a delay is generated by the regeneration sequence valve 16 by the time until the set pressure is reached, so regeneration is performed with the unloader valve 13 opened first by the second electronic control valve 35.

A case in which two electronic control valves 31 and 35 are sequentially controlled is exemplified. First, when the first electronic control valve 31 is controlled to switch to the second position, control input is transmitted to the compressor control outlet 51 and simultaneously compressed air is also supplied to the first control input line 26 of the regeneration sequence valve 16. However, the pressure of the regeneration sequence valve 16 does not reach the set pressure, so the regeneration line 45 is not opened.

Thereafter, when the second electronic control valve 25 is opened and additional pressure is supplied through the second control input line 27, the pressure applied to the control pressure line 26 of the regeneration sequence valve 16 increases, so the set pressure is reached. Accordingly, the regeneration sequence valve 16 is opened and compressed air is supplied to the filter cartridge 14, whereby the regeneration step is performed. In this case, as the second electronic control valve is switched to the second position, the unloader valve 13 is opened.

Therefore, according to a preferred embodiment of the present disclosure, as the second electronic control valve 35 is controlled to switch by the electronic control unit 21, it is operated to open the unloader valve 13 first and then open the regeneration line 45 in accordance with a delay.

Meanwhile, the electronic control unit 21 may be configured to perform return control for maintaining the pressure in the system when regeneration is finished. The return control may be performed in a way of delaying the point in time at which the first electronic control valve returns to the first position. Preferably, when regeneration is finished, the second electronic control valve is returned to the first position by turning off the second electronic control valve 35, but the first electronic control valve 21 is maintained in the on-state, that is, maintained at the second position. In this case, the unloader valve 13 is closed again as the second electronic control valve 35 is closed, so discharge of compressed air through the compressed air supply line 41 is suppressed, whereby the internal pressure of the system can be quickly increased.

Meanwhile, a second embodiment of the present disclosure is shown in FIG. 2.

The example of FIG. 2 is substantially the same as the compressed air processing system of the first embodiment except for the structure of the regeneration sequence valve 16, particularly, the structure of the control input line. That is, in FIG. 2, unlike FIG. 1, the second input line 27 that supplies air through the second electronic control valve 35 is connected to the first control input line 26 without being separated from the first control input line 26. Accordingly, a check valve 28 for preventing backflow of air is installed in the second control input line 27. In the compressed air processing system of the second embodiment, the regeneration sequence valve 16 is opened only when the set pressure is reached by the compressed air flowing inside through the first control input line 26 and the second control input line 27, which is the same as the first embodiment. In the embodiment of FIG. 2, there is an effect that it is possible to simplify the structures of the channel in the regeneration sequence valve and the plunger therein.

INDUSTRIAL APPLICABILITY

The present disclosure was described above on the basis of embodiments and the accompanying drawings. However, the range of the present disclosure is not limited by the embodiments and drawings and may be limited only by claims to be described below.

The invention claimed is:

1. A compressed air processing system for a commercial vehicle, comprising:
    a first electronic control valve controlled by an electronic control unit;
    a second electronic control valve controlled by the electronic control unit; and
    a regeneration sequence valve connected with the first electronic control valve and the second electronic control valve and configured to open a regeneration line by receiving control input through the first electronic control valve and the second electronic control valve,
    wherein air flows through the first electronic control valve supplies to the regeneration line through the regeneration sequence valve as the regeneration sequence valve opens,
    wherein the regeneration sequence valve is configured to open the regeneration line late by a delay upon reaching a preset pressure by receiving air from the first electronic control valve and the second electronic control valve.

2. The compressed air processing system of claim 1, further comprising:
    a compressor control outlet connected to the first electronic control valve; and
    an unloader valve connected to a compressed air supply line connected to a compressor, and pneumatically driven by receiving control input through the second electronic control valve,
    wherein the first electronic control valve and the second electronic control valve are connected to a main supply line connected to the compressed air supply line.

3. The compressed air processing system of claim 2, wherein the first electronic control valve is controlled to switch a valve position by the electronic control unit and transmits air in the main supply line to the compressor control outlet and the regeneration sequence valve, and the second electronic control valve is controlled to switch a valve position by the electronic control unit and transmits the air in the main supply line as control input for the unloader valve and the regeneration sequence valve, respectively.

4. The compressed air processing system of claim 2, wherein the electronic control unit is configured to change the compressor in a driving state by controlling the first electronic control valve to switch and configured to open the unloader valve by controlling the second electronic control valve to switch; and the regeneration sequence valve operates to open the regeneration line only when the first electronic control valve and the second electronic control valve are both open.

5. The compressed air processing system of claim 1, wherein the regeneration sequence valve is opened when the pressure of air that is input from the first electronic control valve and the second electronic control valve a preset pressure.

6. The compressed air processing system of claim 2, wherein, in regeneration, the second electronic control valve is controlled to open the unloader valve by the electronic control unit and the unloader valve is opened in advance before the regeneration line is opened.

7. The compressed air processing system of claim 1, wherein, in a regeneration mode, the electronic control unit simultaneously or sequentially controls the first electronic control valve and the second electronic control valve to switch a valve position.

8. The compressed air processing system of claim 2, wherein the unloader valve is configured to be opened by receiving another control input from the compressed air supply line, and is configured to discharge air in the compressed air supply line to the outside when the pressure of the compressed air supply line exceeds preset pressure.

9. The compressed air processing system of claim 2, wherein a filter cartridge is installed between the compressed air supply line and the main supply line, and a main check valve is installed between the filter cartridge line and the main supply line.

10. The compressed air processing system of claim 9, wherein a regeneration check valve and a throttle are installed in the regeneration line.

11. The compressed air processing system of claim 10, wherein a sep-cooler exhaust line diverging to a sep-cooler is connected between the regeneration check valve and the regeneration sequence valve.

12. The compressed air processing system of claim 1, wherein the regeneration sequence valve is connected to a first control input line into which air flows through the first electronic control valve and a second control input line into which air flows through the second electronic control valve and that is separated from the first control input line; and is configured to be opened by air supplied through the first control input line and the second control input line when internal pressure of the regeneration sequence valve reaches preset pressure.

13. The compressed air processing system of claim 1, wherein the regeneration sequence valve is connected to a first control input line into which air flows through the first electronic control valve and a second control input line into which air flows through the second electronic control valve and that is connected to the first control input line;

a check valve is installed between an intersection of the first control input line and the second control input line and the second electronic control valve; and the regeneration sequence valve is configured to be opened by air supplied through the first control input line and the second control input line when internal pressure of the regeneration sequence valve reaches preset pressure.

* * * * *